United States Patent [19]
Sheffield

[11] Patent Number: 5,960,013
[45] Date of Patent: Sep. 28, 1999

[54] SELF-SEEDED INJECTION-LOCKED FEL AMPLIFER

[75] Inventor: Richard L. Sheffield, Los Alamos, N.Mex.

[73] Assignee: The United States of America as represented by the United States Department of Energy, Washington, D.C.

[21] Appl. No.: 09/050,121

[22] Filed: Mar. 30, 1998

Related U.S. Application Data

[60] Provisional application No. 60/055,919, Aug. 18, 1997.

[51] Int. Cl.⁶ ........................................................ H01S 3/00
[52] U.S. Cl. .................................. 372/2; 372/99; 372/37
[58] Field of Search ................................... 372/2, 37, 74, 372/99

[56] References Cited

U.S. PATENT DOCUMENTS 5,790,573  8/1998  Heller ........................................... 372/2

*Primary Examiner*—Leon Scott, Jr.
*Attorney, Agent, or Firm*—Ray G. Wilson; William R. Moser; Paul A. Gottlieb

[57] ABSTRACT

A self-seeded free electron laser (FEL) provides a high gain and extraction efficiency for the emitted light. An accelerator outputs a beam of electron pulses to a permanent magnet wiggler having an input end for receiving the electron pulses and an output end for outputting light and the electron pulses. An optical feedback loop collects low power light in a small signal gain regime at the output end of said wiggler and returns the low power light to the input end of the wiggler while outputting high power light in a high signal gain regime.

7 Claims, 5 Drawing Sheets

SELF-SEEDED INJECTION-LOCKED FEL AMPLIFER

RELATED CASES

This application claims the benefit of U.S. provisional application Ser. No. 60/055,919 filed Aug. 18, 1997.

This invention was made with government support under Contract No. W-7405-ENG-36 awarded by the U.S. Department of Energy. The government has certain rights in the invention.

BACKGROUND OF THE INVENTION

This invention relates to free electron lasers, and, more particularly, to self-seeded free electron lasers.

Free electron lasers (FELs) have existed for over a decade. FELs are broadly tunable laser sources and have the potential for high power outputs with average powers scalable to the megawatt level. But, thus far, the highest average power generated continuously by an FEL is only slightly more than 10 watts. The low average power is caused by a typically poor light extraction efficiency and by deleterious effects on the resonator mirrors, such as optical damage and thermally induced distortion. The extraction efficiency has been somewhat improved with the use of tapered magnetic field wigglers for the electron beam, but, due to losses in the conventional optical resonator, the efficiency of the FEL remains low, typically less than 1% for infrared wavelengths.

Four approaches to FELs have been tried or suggested: (1) oscillator, (2) amplifier, (3) externally-seeded amplifier, and (4) oscillator-amplifier. In an oscillator, relatively high reflectivity mirrors are used to have the light recirculate in an optical resonator. To attain high powers from the FEL, thus, requires an even higher recirculating power inside the resonator. The recirculating power is at least three times higher than the output power, and typically ten to twenty times higher than the output power. For a high-average power device, the damage to the mirror coatings and the requirements for cooling the mirrors add cost and operating complexity. Also, an oscillator has very tight tolerances on mirror alignment and length positioning, with concomitant problems in system stability and ease of use.

An amplifier does not have the problems with optics, since optics are not required. However, to attain saturation of the generated light, a much longer wiggler is required than with an oscillator, again with increased cost and system complexity. Another disadvantage of the amplifier is that the optical mode can grow larger than the wiggler gap and result in a loss of optical power.

An externally-seeded amplifier, i.e., an amplifier with externally generated and injected light to seed the generation of light, has the same basic constraints as an amplifier except that the output frequency is determined by the external light source. An external light source adds cost and complexity. Also, an external light source, e.g., a laser, may not be available to produce the desired optical frequency.

The oscillator-amplifier combines the advantages of an oscillator and amplifier. The oscillator is used to attain a moderate power level that is below the damage level of the optics. Also, the frequency stability is determined to a large degree by the resonator feedback. By the addition of a frequency selective device, the frequency can be tuned or precisely controlled, although such devices generally have much lower damage thresholds than for high-power optics, and consequently are difficult to use in even lower-power oscillators. The amplifier then is used to attain a high efficiency. This system is obviously much more complex than either the oscillator or amplifier configurations.

These issues are addressed by the present invention and a high gain amplifier is provided using a self seed injection-locked optical feedback to a wiggler to be further amplified by an input electron beam.

Accordingly, it is an object of the present invention to provide a FEL having a high output laser average power.

It is another object of the present invention to provide a high power FEL that is relatively low in complexity.

One other object of the present invention is provide a high power FEL operating in a stable regime.

Still another object of the present invention is to minimize damage to optical components in the laser output system.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise a self-seeded free electron laser (FEL). An accelerator outputs a beam of electron pulses to a magnetic field wiggler having an input end for receiving the electron pulses and an output end for outputting light and the electron pulses. An optical feedback loop collects low power light in a small signal gain regime at the output end of said wiggler and returns the low power light to the input end of the wiggler while outputting high power light in a high signal gain regime.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Figure 1:
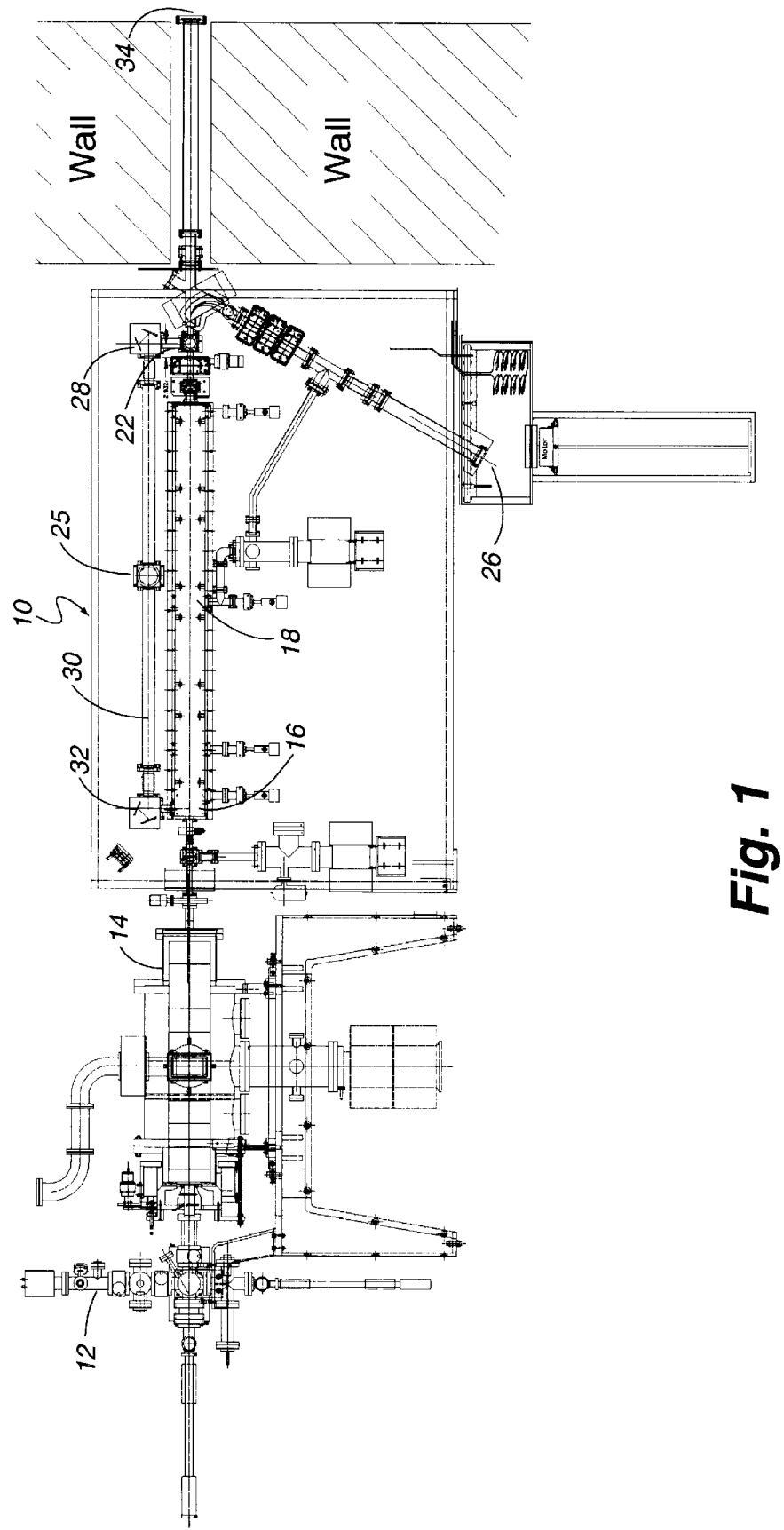
FIG. 1 is a pictorial illustration of a self-seeded, injection-locked FEL amplifier according to one embodiment of the present invention.

FIG. 1 depicts a self-seeded injection-locked FEL according to the present invention. FEL 10 is modified from the advanced FEL described in U.S. Pat. No. 5,336,972, issued Aug. 9, 1994, incorporated herein by reference, to provide the high performance characteristics described below. Photoinjector 12 produces electron pulses that are injected into accelerator 14, which is operated to output a high average current electron beam that is focused by two quadrupole doublets through upstream mirror 16 into permanent magnet wiggler 18. Wiggler 18 is bracketed by flat annular mirrors 16 and 22. An optical feedback loop 30 is established through parabolic mirrors 28 and 32 to reinject the fed-back optical pulse in synchronism with the separation of the electron beam micropulses. Feedback loop 30 may include a selection device 25 for selecting characteristics of the optical pulse, such as frequency or amplitude, to control the resulting output light pulse.

Optical power radiated from the electron beam is returned to wiggler 18 through feedback loop 30 for a few passes until the optical power in feedback loop 30 is sufficiently high to cause wiggler 18 to radiate a high-power optical beam 34. After passage through wiggler 18, the electron beam is bent away from the optical signal path and the power is dissipated in beam dump 26.

The present invention recognizes that, in the small-signal regime, the optical beam output from wiggler 18 takes on an annular shape, i.e., a donut shape, with most of the power located outside of the center region of the donut. This optical beam shape then primarily directs the optical power onto the annular mirrored portion of annular mirror 22, which is then reflected into feedback loop 30 in the small signal gain regime. As the optical power reaches saturation, the optical beam evolves into a lorentzian shape with most of the optical power residing on-axis, i.e., in the center of the donut, in the high signal gain regime. Thus, in the large signal regime, the majority of the optical power exits through the hole in annular mirror 22.

Due to this mode evolution, optical feedback loop 30 provides a variable outcoupling, i.e., transmission of optical energy, that changes from negligible outcoupling (nearly 100% feedback) in the small-signal regime to greater than 97% outcoupling in the saturated region. This variable outcoupling offers three advantages. First, the optical power on the mirror portion of annular mirror 22 remains low at all time, thereby minimizing the risk of optical damage. Second, almost all of the saturated power exits the FEL as useful output. Third, the variable outcoupling allows the optical power to build up rapidly to saturation, resulting in a high-power beam from almost all micropulses. Unlike conventional oscillators, the efficiency of the regenerative amplifier FEL is nearly the same as the extraction efficiency.

Many differing techniques can be used to provide for the low-power optical feedback to take advantage of the evolving beam shape. For instance, one or more small mirrors can be located off-axis from the main optical beam rather than the annular mirror described above.

Figure 2:
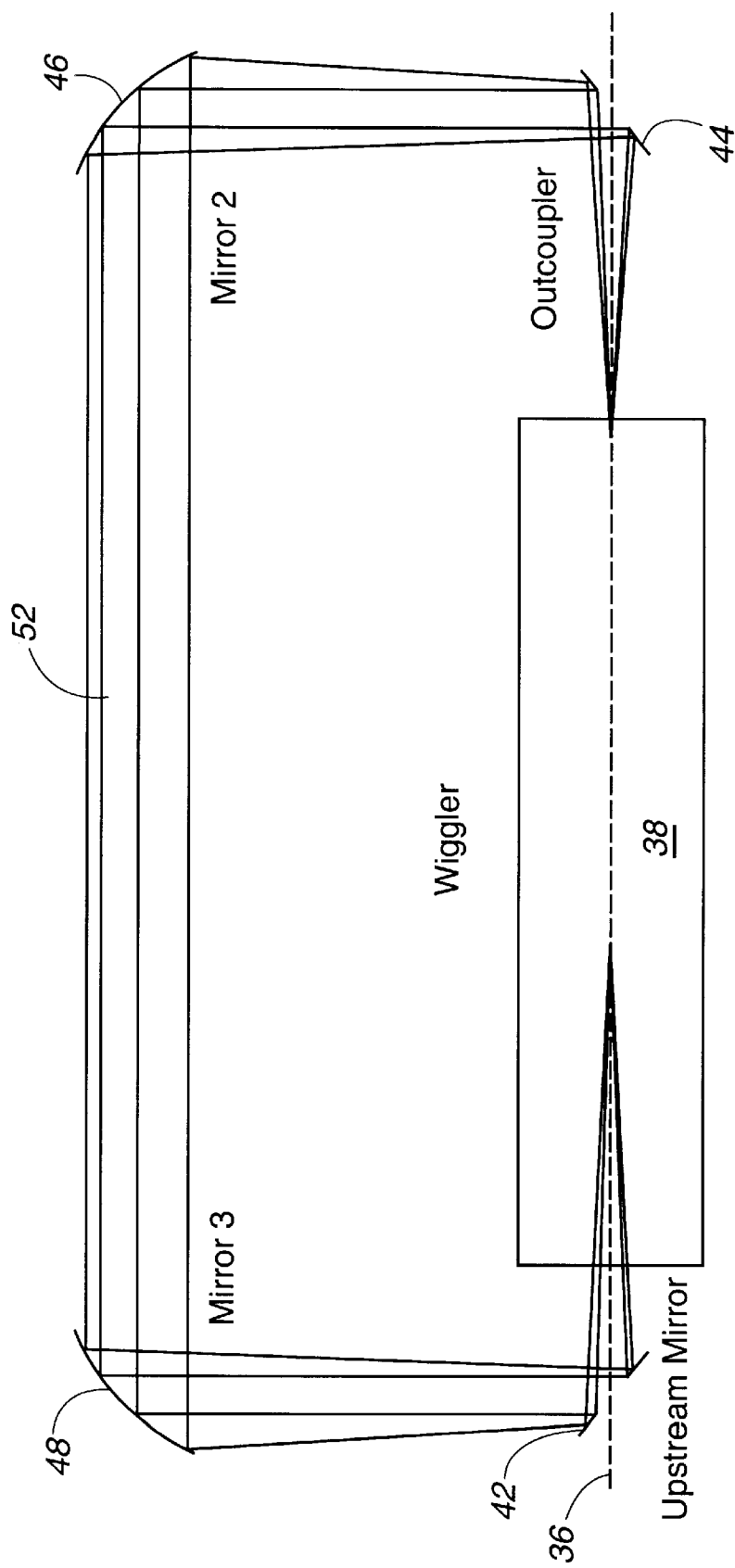
FIG. 2 is a schematic diagram of a regenerative amplifier for use in the FEL amplifier shown in FIG. 1.

FIG. 2 more particularly depicts the optical feedback loop that is designed to provide a small amount of optical power to the entrance of wiggler 38 in synchronism with the micropulses of electron beam 36 so that the reamplification process for the fed back optical signal restarts from a coherent optical signal. The optical feed back loop consists of four mirrors: two flat annular mirrors 42 and 44 and two parabolic mirrors 46 and 48. The total path of the feedback loop is selected to provide a delay in the optical feed back loop in synchronism with the separation of electron micropulses in electron beam 36.

The feedback loop can be used to further improve the performance of the FEL. Thus, in the feedback leg, selection device 50 may be gratings, gas-cells and other frequency controlling devices can be used to give very narrow output frequency tuning. Also, time-varying optical devices, such as Pockels cells and acoustooptic modulators, can be used for both temporal amplitude and frequency control of the output FEL beam.

Because a very small amount of light is required for feedback, low reflectivity optics, such as gratings, or power sensitive optics not normally used in laser oscillators can be used in this invention. The ability to use low reflectivity optics also provide the capability of operating in the x-ray (20–90 nm) regime. Typically, good optics have a reflectivity of greater than 98%, while the best optics available in the x-ray regime have only about 50% reflectivity. But this low reflectivity can be accommodated by use of the feedback optics according to the present invention.

Figure 3:
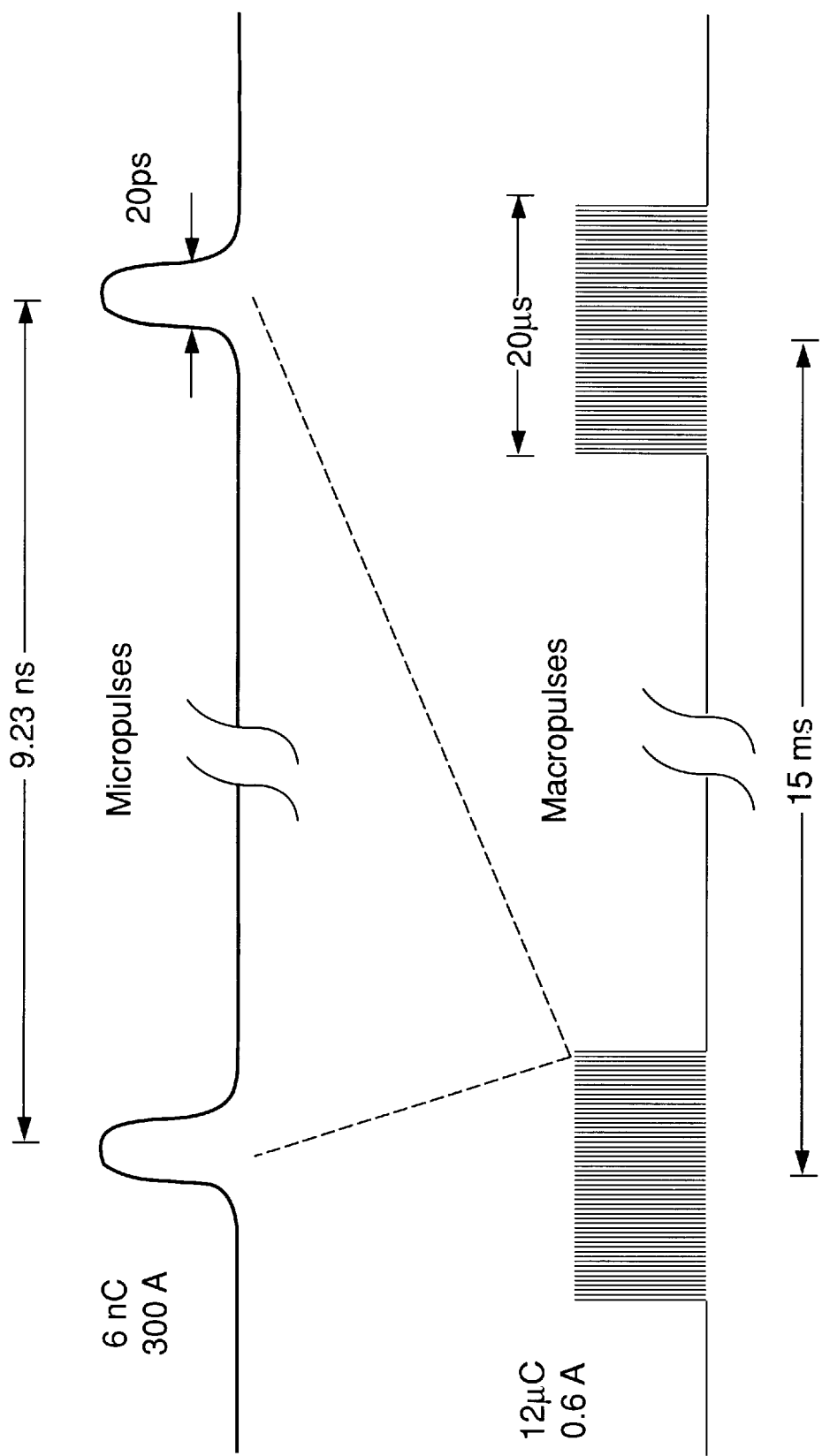
FIG. 3 graphically illustrates the temporal format of a high-average-current electron beam for use with the amplifier shown in FIG. 2.

In an exemplary embodiment, photoinjector 12 (FIG. 1) uses a mode locked Nd:YLF laser driving a cesium telluride photocathode. A macropulse repetition rate of 60 Hz is achieved by switching from lamp-pumped amplifiers to diode-array-pumped amplifiers designed to operate at a high duty cycle. The resulting electron beam is a train of 17 MeV, 300 A micropulses (6 nC in nominally 20 ps pulses) at 108.3 MHz ($1/12^{th}$ of the 1300 MHz rf from the klystron power source). Accelerator 14 (FIG. 1) includes a 1300 MHz klystron-based rf source (Thomson-CSF TH-2104U klystron) that outputs an average power of 20 MW in bursts. FIG. 3 depicts the temporal format of this electron beam having a high average current for application to the present invention.

Optical feedback path 52 is designed to provide an optical delay of twice the micropulse separation, or a delay of 18.46 ns in the exemplary embodiment. Thus, the separation between annular mirrors 42 and 44 (and parabolic mirrors 46 and 48) is 239.2 cm and the separation between annular mirrors 42 and 44 and parabolic mirrors 46 and 48, respectively, is 37.5 cm. The radii of curvature of the two paraboloids are 75 cm for upstream paraboloid 48 and 120 cm for downstream paraboloid 46 with reference to electron beam travel. These values were selected to collimate the donut-shaped optical beam between the paraboloids and to reimage optical beam 52 to the entrance of wiggler 38. Annular mirror 42 has a 5 mm diameter hole to maintain greater than 99.5% electron beam 36 transport through mirror 42. The hole in annular mirror 44 is preferably 14 mm in diameter so that the mirrored portion is outside the predicted lorentzian peak radius of 7 mm for the output optical beam.

Wiggler 38 is a high-gain, high-efficiency wiggler configuration. In an exemplary embodiment, wiggler 38 is a 2 meter long, segmented (1 meter uniform followed by 1 meter tapered) plane-polarized wiggler with 2 cm periods. Each period conventionally consists of four samarium-cobalt permanent magnets in a modified Halbach configuration. A rectangular notch is cut on the pole face of each magnet to provide nearly equal two-plane focusing via the sextupole component of the wiggler field. The tapered wiggler segment has a 30% taper in the magnetic field that is formed by opening up the wiggler gap.

The precise form of the tapering, that is, the axial (z) variation of the wiggler field amplitude $B_W$ is given by:

$$B_W(z) = B_{W0} \text{ for } 0 \leq z \leq z_o$$

$$B_W(z) = B_{W0}(1 - \alpha(z/L_W)) \text{ for } z_o < z < L_W$$

In the exemplary embodiment, $B_{W0} = 0.7$ T, $z_o = 1$ m, $L_W = 2$ m, and the taper parameter $\alpha = 0.6975$. The wiggler is tapered in field amplitude rather than wavelength ($\lambda_w$=2 cm is constant) in order to allow for as large a gap as possible to accommodate the optical mode at the wiggler exit.

The wiggler was designed primarily by single-wavefront (single frequency, no pulse effects) amplifier simulations. For the parameters listed in Table 1, the maximum small-signal gain $G_{ss}$ is very large: $G_{ss}$=2.5×10$^4$ at an optical wavelength of 15.8 μm. The theoretical 3-D gain length (power e-folding distance) for the parameters of the uniform wiggler part of the device is $(2k_{w\rho}\sqrt{3})^{-1}$=8.1 cm. Here, $k_W$ is the wiggler wavenumber and ρ is the high-gain FEL scaling parameter, with a value ρ=0.011 in the uniform wiggler part of the device. The small-signal gain bandwidth is Δλ=0.6 μm. The large signal (0.27 MW injected power at the wiggler entrance) behavior peaks at a wavelength of 16.4 μm where the gain is 2114 (571 MW output power) and the extraction efficiency is 6.0%. This wavelength provides a small-signal gain of 2.5×10$^6$, which is quite adequate.

Referring again to FIG. 2, Table 1 presents exemplary e-beam and wiggler parameters for use in performance simulations.

TABLE 1

| ELECTRON BEAM PARAMETERS | |
| --- | --- |
| Peak Current | 300 A |
| FWHM (top-hat shape pulse) | 18 ps |
| Electron kinetic energy | 17 MeV |
| Fractional energy spread | 0.1% |
| Normalized transverse emittance | 7.5 mm-mr(rms) |
| WIGGLER MAGNET PARAMETERS | |
| Total length | 2 cm |
| Wavelength ($\lambda_w = 2\pi/k_w$) | 2 cm |
| Maximum field amplitude ($B_w$) | 0.7 T |
| Maximum $a_w = \dfrac{e}{\sqrt{2}\, mc} \cdot \dfrac{B_w}{k_w}$ | |
| Minimum/maximum full gap | 0.59/.88 cm |
| Untapered length | 1 m |
| Magnitude of linear field taper | 30.25% |
| Two plane focusing, equal strength in both directions | |
| Betatron wavelength | 1.05 m |

As shown in FIG. 2, optical path 52 defines a ring-type optical cavity to improve the amount of light fed back to the wiggler entrance by avoiding propagation of that light through the restrictive apertures of wiggler 38. Outcoupler mirror 44 is an annular mirror, as is upstream mirror 42, because electron beam 36 must pass through both of these mirrors. There are two other reasons for annular outcoupler mirror 44. The optical mode on this mirror at small-signal conditions is also annular, so that almost all of the light is sent back along the optical path 52. At large-signal condition, the optical mode on outcoupler mirror 44 is peaked on-axis so that the annular outcoupler 44 only reflects back in optical path 52 the low intensity radial wings of the mode. Thus, almost all of the mode at small-signal is fed back by this scheme, while at large-signal the feedback is very small and most of the power is outcoupled as useful optical energy.

Table 2 lists some exemplary parameter values for the optical elements along optical path 52.

TABLE 2

| Outcoupler 44 | |
| --- | --- |
| Position (x, y, z) | (0, 0, 130) |
| Inner hole radius | 0.70 cm |
| Radius of curvature | flat |
| Mirror 2 46 | |
| Position | (37.5, 0, 130) |
| Inner hole radius | 0.0 cm |
| Radius of curvature | 110.0 cm |
| Mirror 3 48 | |
| Position | (37.5, 0, −109.2) |
| Inner hole radius | 0.0 cm |
| Radius of curvature | 75.0 cm |
| Upstream Mirror 42 | |
| Position | (0, 0, −109.2) |
| Inner hole radius | 0.25 cm |
| Radius of curvature | flat |

Figure 4:
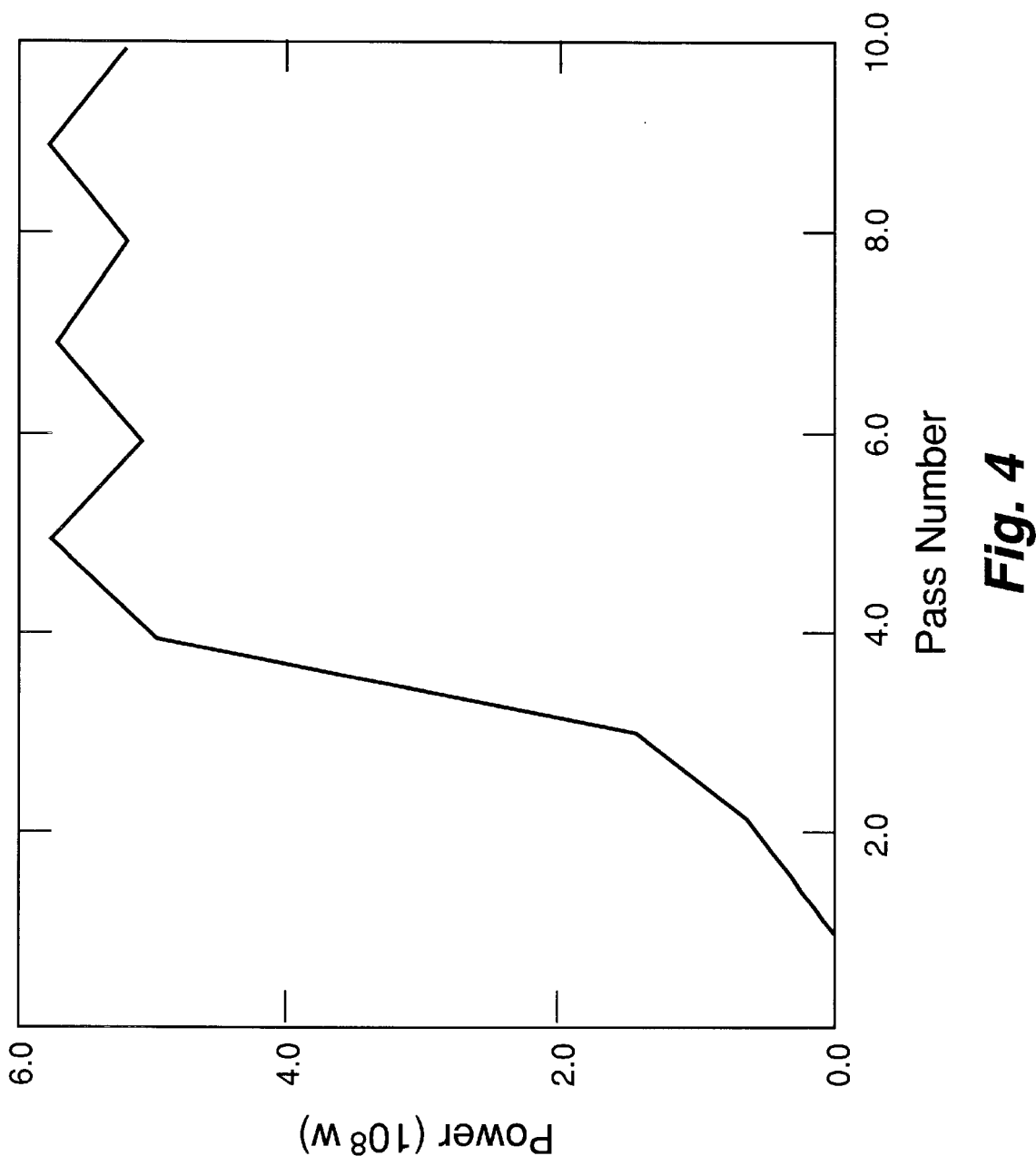
FIG. 4 graphically depicts power build-up as a function of the number of light passes through the FEL wiggler.

All of the mirrors have an outer radius of 3.0 cm. The buildup of power in the cavity at the end of wiggler 38 as a function of pass number is shown in FIG. 4. The oscillations at steady-state, with a period of two passes, can usually be tuned away by changing the inner hole radius of one of annular mirrors 42, 44, or the radii of curvature of parabolic mirrors 46, 48, or both. The predicted extraction efficiency varies between 6% and 7%, and can be improved by simply extending the length of the tapered section of wiggler 38.

Figure 5:
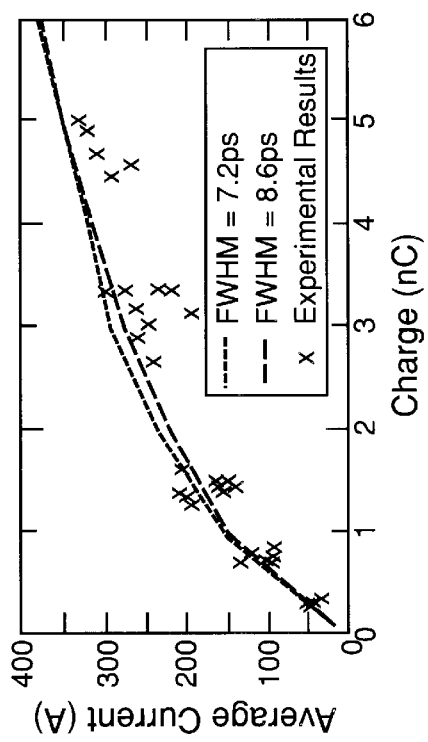
FIG. 5 graphically depicts a comparison of measured average current with PARMELA simulations as a function of beam pulse charge.

Initial experimental results consist of peak current measurements, wiggler radiation wavelength determination, and gain measurements. The average current is calculated by dividing the average micropulse charge by the full-width half-maximum (FWHM) micropulse pulse length. The average charge is measured using a calibrated toroid of less than 5% error. The FWHM pulse width is measured using a Hamamatsu streak camera in the synchroscan mode. The average micropulse current results are shown graphically in FIG. 5. The two dotted lines are from PARMELA simulations with different exemplary photocathode-laser input pulse-widths, 7.2 ps and 8.6 ps. The measured current is less than the PARMELA results and the difference is attributed to an uncertainty in the cathode radius, nominally 7 mm.

Figure 6:
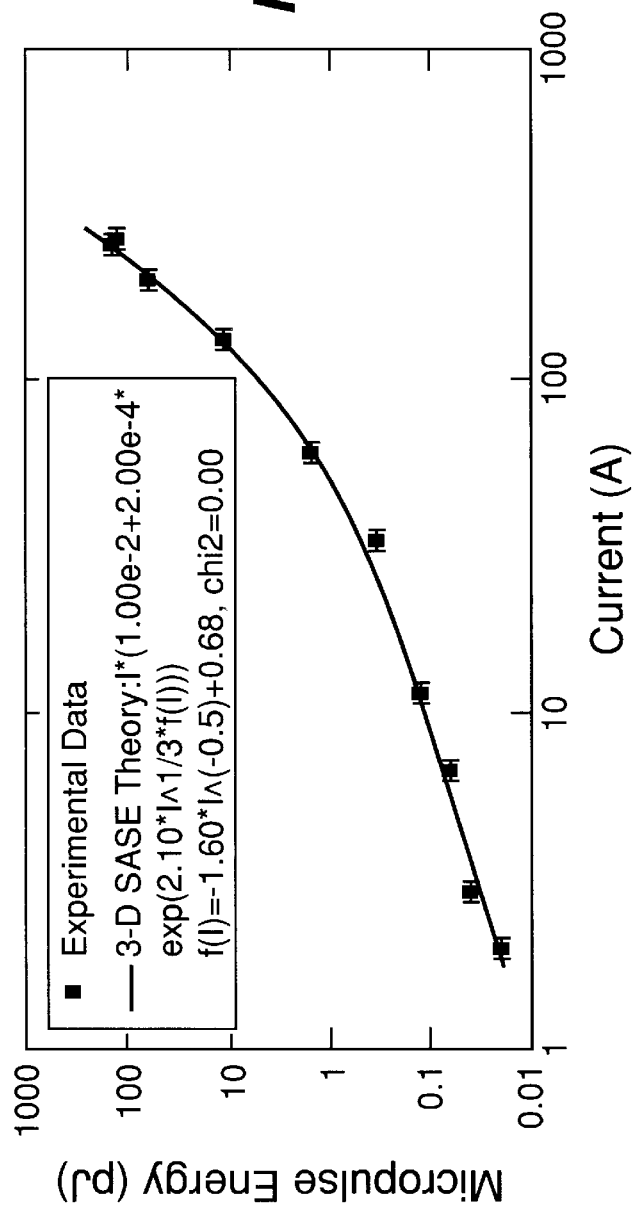
FIG. 6 graphically depicts the output signal from an infrared detector as a function of beam pulse charge.

The infrared optical power was also measured with a Molectron J3-02 detector and the results depicted in FIG. 6. The power level was 0.22 nj/micropulse at the high charge (+/−20%) consistent with the 60 times the calculated spontaneous emission power at high charge. From a fit of the experimental data to the SASE theory, the gain is calculated to be in excess of 3000. The gain factor of 3000 is substantial and demonstrates that the invention works. Though the initial experiments have not yet demonstrated the much higher predicted gains of 2×10$^4$, even at these lower values of gain the basic principles of the invention are applicable and the device still functions properly.

To further increase the gain, the diameter of the hole in the upstream mirror 16 (FIG. 1) and 42 (FIG. 2) may be reduced to 4 mm. It is expected that the smaller hole will provide more feedback, allowing the FEL to reach the calculated 6% efficiency.

The foregoing description of the self seeded injection-locked FEL amplifier has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its amplification capability to thereby enable others skilled in the art to best utilize the invention in various embodiments and with various modifications as are suited to the particular use contemplated. It is intended that the scope of the invention be defined by the claims appended hereto.

What is claimed is:

1. A self-seeded free electron laser (FEL) comprising:
    an accelerator outputting a beam of electron pulses;
    a magnetic field wiggler receiving said electron pulses at an input end and outputting light and said electron pulses at an output end;
    an optical feedback loop for collecting low power light in a small signal gain regime at said output end of said wiggler and returning said low power light to said input end of said wiggler while outputting high power light in a high signal gain regime.

2. A self-seeded FEL according to claim 1, wherein said optical feedback loop includes flat annular mirrors at said output and input ends of said wiggler.

3. A self-seeded FEL according to claim 2, wherein said wiggler includes a section having a uniform magnetic field strength and a second section having a tapered magnetic field strength.

4. A self-seeded FEL according to claim 2, wherein said optical feedback loop has a length effective to synchronize the arrival of the low power light with the arrival of pulses in said beam of electron pulses.

5. A self-seeded FEL according to claim 1, wherein said optical feedback loop has a length effective to synchronize the arrival of the low power light with the arrival of pulses in said beam of electron pulses.

6. A self-seeded FEL according to claim 1, 2, 3, 5, or 4, wherein said optical feedback loop includes means for selecting operating parameters for said low power light selected from the group of parameters consisting of frequency and amplitude.

7. A self-seeded FEL according to claim 1, wherein said optical feedback loop includes optics that have low reflectivity in a selected wavelength range for operating said FEL.

* * * * *